US012003451B2

United States Patent
Hunukumbure et al.

(10) Patent No.: US 12,003,451 B2
(45) Date of Patent: Jun. 4, 2024

(54) METHOD AND APPARATUS FOR POSITIONING REFERENCE SIGNAL CONFIGURATION IN A WIRELESS COMMUNICATION SYSTEM

(71) Applicant: Samsung Electronics Co., Ltd., Suwon-si (KR)

(72) Inventors: Mythri Hunukumbure, Staines (GB); Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 17/594,099

(22) PCT Filed: Apr. 1, 2020

(86) PCT No.: PCT/KR2020/004453
§ 371 (c)(1),
(2) Date: Oct. 1, 2021

(87) PCT Pub. No.: WO2020/204598
PCT Pub. Date: Oct. 8, 2020

(65) Prior Publication Data
US 2022/0190975 A1    Jun. 16, 2022

(30) Foreign Application Priority Data
Apr. 2, 2019   (GB) ..................... 1904642

(51) Int. Cl.
*H04L 5/00* (2006.01)
*H04W 64/00* (2009.01)

(52) U.S. Cl.
CPC ............ *H04L 5/005* (2013.01); *H04L 5/0073* (2013.01); *H04W 64/00* (2013.01)

(58) Field of Classification Search
CPC ......... H04L 5/005; H04L 5/073; H04L 64/00; H04L 27/26025; H04L 27/261
See application file for complete search history.

(56) References Cited

U.S. PATENT DOCUMENTS

| | | | |
|---|---|---|---|
| 2017/0311276 A1 | 10/2017 | Tsai et al. | |
| 2019/0007923 A1 | 1/2019 | Blankenship et al. | |
| 2020/0322119 A1 | 10/2020 | Matsumura et al. | |
| 2021/0297215 A1* | 9/2021 | Da | H04W 72/0446 |
| 2021/0345130 A1* | 11/2021 | Bi | H04W 24/10 |
| 2022/0131727 A1* | 4/2022 | Khoryaev | H04L 27/261 |

(Continued)

FOREIGN PATENT DOCUMENTS

| | | |
|---|---|---|
| WO | 2017184865 A1 | 10/2017 |
| WO | 2017204285 A1 | 11/2017 |
| WO | 2018028775 A1 | 2/2018 |

OTHER PUBLICATIONS

Nokia, Nokia Shanghai Bell, "Potential Positioning Techniques—UL based solutions", R1-1901848 3GPP TSG RAN WG1 Meeting #96 Athens, Greece, Feb. 25-Mar. 1, 2019 Agenda item: 7.2.10.1.2 (Year: 2019).*

(Continued)

*Primary Examiner* — Gary Mui (57) ABSTRACT

Disclosed is a method of configuring a Positioning Reference Signal, PRS, in each of a plurality of cells in a telecommunication network. The method of a serving base station (BS) may include transmitting a second positioning reference signal (PRS) to a user equipment (UE); receiving, from the UE, a request to request a neighbor BS to configure a first PRS to occupy $(1/\mu)^{th}$ of slot duration of a Sub Carrier Spacing (SCS) of the neighbor BS; and transmitting the request to the neighbor BS, wherein the neighbor BS having a lower (SCS) than an SCS of the serving BS, and wherein $\mu$ is the ratio of the SCS of the serving BS to the SCS of the neighbor BS.

15 Claims, 4 Drawing Sheets

(56) References Cited

U.S. PATENT DOCUMENTS

| | | | |
|---|---|---|---|
| 2022/0150098 A1* | 5/2022 | Bi | H04L 5/0007 |
| 2022/0182200 A1* | 6/2022 | Qi | H04W 72/044 |
| 2023/0267686 A1* | 8/2023 | Kim | G06T 7/13 |
| | | | 345/419 |

OTHER PUBLICATIONS

Intel Corporation, "Design Aspects for NR UL Positioning", R1-1902512 3GPP TSG RAN WG1 Meeting #96 Athens, Greece, Feb. 25-Mar. 1, 2019 Agenda item: 7.2.10.1.2 (Year: 2019).*

Nokia et al., "Potential Positioning Techniques—DL based solutions," 3GPP TSG RAN WG1 Meeting #AH-1901 R1-1901022, Taipei, Taiwan, Jan. 2019, 5 pages.

Samsung, "DL only based Positioning," 3GPP TSG RAN WG1 WG1 Ad-Hoc Meeting 1901 R1-1901090, Taipei, Taiwan, Jan. 2019, 4 pages.

CATT, "NR Positioning Reference Signals for OTDOA," 3GPP TSG RAN WG1 Meeting #95 R1-1812616, Spokane, USA, Nov. 2018, 14 pages.

Office Action dated Aug. 30, 2019, in connection with United Kingdom Patent Application No. 1904642.4, 6 pages.

International Search Report and Written Opinion of the International Searching Authority in connection with International Application No. PCT/KR2020/004453 dated Jul. 10, 2020, 8 pages.

Mitsubishi Electric, "Views on reference signal designs for NR positioning", R1-1904600, 3GPP TSG RAN WG1 Meeting #96b, Xian, China, Apr. 8-12, 2019, 8 pages.

CATT, "Further discussion of NR RAT-dependent DL Positioning", R1-1901980, 3GPP TSG RAN WG1 Meeting #96, Athens, Greece, Feb. 25-Mar. 1, 2019, 31 pages.

VIVO, "Views on NR downlink positioning techniques", R1-1901714, 3GPP TSG RAN WG1 Meeting #96, Athens, Greece, Feb. 25-Mar. 1, 2019, 7 pages.

Campos, "Understanding the 5G NR Physical Layer", NR Physical Layer Architect, RAN1 Delegate, Keysight Technologies, Nov. 1, 2017, 111 pages.

* cited by examiner

FIG. 1

| μ | $\Delta f = 2^\mu \cdot 15$ kHz | Cyclic Prefix |
|---|---|---|
| 0 | 15 kHz | Normal |
| 1 | 30 kHz | Normal |
| 2 | 60 kHz | Normal, Extended |
| 3 | 120 kHz | Normal |
| 4 | 240 kHz | Normal |
| 5 | 480 kHz | Normal |

- μ = 0, 1: Data < 6 GHz
- μ = 2, 3: Data > 6 GHz
- μ = 5: Specified but not supported

FIG. 2

(a) mini-slot P-RS pattern for cell with SCS= 15kHz (b) P-RS pattern for cell with SCS= 30kHz

FIG. 3

(a) mini-slot P-RS pattern for cell with SCS= 15 kHz (b) P-RS pattern for cell with SCS= 60 kHz

METHOD AND APPARATUS FOR POSITIONING REFERENCE SIGNAL CONFIGURATION IN A WIRELESS COMMUNICATION SYSTEM

CROSS-REFERENCE TO RELATED APPLICATIONS

This application is a 371 of International Application No. PCT/KR2020/004453, filed Apr. 1, 2020, which claims priority to United Kingdom Patent Application No. 1904642.4, filed Apr. 2, 2019, the disclosures of which are herein incorporated by reference in their entirety.

BACKGROUND

1. Field

The present invention relates to an improved positioning reference signal configuration and an improved telecommunication network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

A method, a base station and a user equipment for configuring a Positioning Reference Signal in a wireless communication system is provided. A first PRS is configured for a first cell and a second PRS is configured for a second cell. The first cell has a lower Sub Carrier Spacing, SCS (subcarrier spacing), and the first PRS is configured to occupy $(1/\mu)^{th}$ of the slot duration of the first SCS cell, such that it is arranged to have the same duration as the second PRS, where $\mu$ is the ratio of the second cell SCS to the first cell SCS.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

According to the present disclosure there is provided an apparatus and method as set forth in the appended claims. Other features of the invention will be apparent from the dependent claims, and the description which follows.

In one embodiment, a user equipment (UE) in a wireless communication system is provided. The UE may include a transceiver and at least one processor operably connected to the transceiver. The at least one processor may be configured to receive a first positioning reference signal (PRS) from a neighbor base station (BS) and a second PRS from a serving BS, identify the neighbor BS having a lower Sub Carrier Spacing (SCS) than an SCS of the serving BS, and transmit, to the serving BS, a request to request the neighbor BS to configure the first PRS to occupy $(1/\mu)^{th}$ of slot duration of the SCS of the neighbor BS, where $\mu$ is the ratio of the SCS of the serving BS to the SCS of the neighbor BS.

In one embodiment, the first PRS may be configured to occupy $(1/\mu)^{th}$ of the slot duration of the neighbor BS to be arranged to have the same duration as the second PRS.

In one embodiment, a particular PRS configuration may be indicated by means of one or more control bits in signaling between the serving BS and the neighbor BS.

In one embodiment, the at least one processor may be further configured to be informed from the serving BS about PRS configuration in the neighbor BS through physical downlink control channel (PDCCH).

In one embodiment, the first PRS may be configured for a defined time period before reverting to an original or another configuration. In another embodiment, a serving base station (BS) in a wireless communication system is provided. The serving BS may include a transceiver and at least one processor operably connected to the transceiver. The at least one processor may be configured to transmit a second positioning reference signal (PRS) to a user equipment (UE), receive, from the UE, a request to request a neighbor BS to configure a first PRS to occupy $(1/\mu)^{th}$ of slot duration of a Sub Carrier Spacing (SCS) of the neighbor BS, and transmit the request to the neighbor BS, where $\mu$ is the ratio of the SCS of the serving BS to the SCS of the neighbor BS. The neighbor BS may have a lower (SCS) than an SCS of the serving BS.

In another embodiment, the at least one processor may be further configured to inform the UE about PRS configuration in the neighbor BS through physical downlink control channel (PDCCH).

In yet another embodiment, a method of a serving base station (BS) in a wireless communication system is provided. The method may include transmitting a second positioning reference signal (PRS) to a user equipment (UE), receiving, from the UE, a request to request a neighbor BS to configure a first PRS to occupy $(1/\mu)^{th}$ of slot duration of a Sub Carrier Spacing (SCS) of the neighbor BS, and transmitting the request to the neighbor BS, where $\mu$ is the ratio of the SCS of the serving BS to the SCS of the neighbor BS and the neighbor BS has a lower (SCS) than an SCS of the serving BS.

In yet another embodiment, there is provided a method of configuring a Positioning Reference Signal, PRS, in each of a plurality of cells in a telecommunication network wherein a first PRS is configured for a first cell and a second, different, PRS is configured for a second cell, wherein the first cell has a lower Sub Carrier Spacing, SCS, and the first PRS is configured to occupy $(1/\mu)^{th}$ of the slot duration of the first SCS cell, such that it is arranged to have the same duration as the second PRS, where $\mu$ is the ratio of the second cell SCS to the first cell SCS.

In one embodiment, $\mu$ is any integer.

In one embodiment, $\mu$ is 2n where n is any integer.

In one embodiment, a User Equipment, UE, in the second cell requests its base station, gNB, to request the first cell's gNB to configure the first PRS to occupy $(1/\mu)^{th}$ of the slot duration of the first SCS cell.

In one embodiment, a particular PRS configuration is indicated by means of one or more control bits in signalling between the second cell and the first cell.

In one embodiment, the first cell informs the UE about the PRS configuration in any neighbours through its control channel, PDCCH, signalling.

In one embodiment, the first PRS is configured for a defined time period before reverting to its original or another configuration.

In yet another embodiment, the apparatus comprises a base station, gNB.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

There is an issue regarding the time duration of the default Positioning Reference Signal (PRS) configuration in wireless systems. This is apparent when User Equipments (UEs) in neighbouring cells with different Sub Carrier Spacing (SCS) need to utilize each other's base stations' (gNBs') PRS. The UE with the higher SCS (i.e. shorter slot duration) may have to wait a multiple of 2µ slots.

It is desirable for a UE to know accurately its position to be compliant with E911 and other emergency services requirements, amongst other reasons. OTDOA (Observed Time Difference Of Arrival) has been identified as a key method for achieving such positioning for both Downlink (DL) and Uplink (UL).

In 5G or NR systems, a number of SCS have been defined, both for Frequency Ranges 1 and 2 (FR1 and FR2). The symbol times therefore shrink accordingly for higher SCS in NR.

To implement the OTDOA method of positioning in NR, for example in the DL, the UE may need to measure the arrival times of PRS signals from at least 3 gNBs. It is quite possible that the gNBs will be operating with different SCS, for example, to best cater for the main service type supported by the particular gNB. In other words the neighbouring gNBs may be servicing different use cases and so may have different SCS configurations.

Embodiments of the present disclosure define configurable PRS patterns to address the delay experienced and are particularly useful in low latency positioning applications.

However, for low latency applications, it is advantageous to provide a configurable PRS pattern, which can adapt the PRS sequence density to reduce the time needed by the higher SCS UE to read all the neighbouring cells and serving cell PRS information. Embodiments of the disclosure provide these different density PRS patterns, which reduce the latency and also reduce the power consumption in OTDOA based localization.

Although a few preferred embodiments of the present disclosure have been shown and described, it will be appreciated by those skilled in the art that various changes and modifications might be made without departing from the scope of the invention, as defined in the appended claims.

When neighbouring cells employ different numerologies in NR, in terms of different sub-carrier spacing (SCS), the PRS design for the higher SCS cell may be modified. Such modifications may focus on the PRS pattern for the higher SCS (lower slot duration) cell. However, in such a case, a UE in the higher SCS cell may have to detect the PRS patterns of the neighbouring, lower SCS, cell over 2 (or a multiple of 2, based on the SCS ratio µ) of its slots, lengthening the position estimation time. For some low latency and also low energy consumption applications, this delay may be unacceptable or at least undesirable.

In an embodiment of the present disclosure, there is provided a modification to the lower SCS cell PRS duration, so that the higher SCS UE can detect the neighbor PRS patterns in single slot duration of its time/frequency grid. Also provided are control bits to configure the PRS (time density) patterns adaptively to respond to requests by the neighbouring cells.

Figure 1:
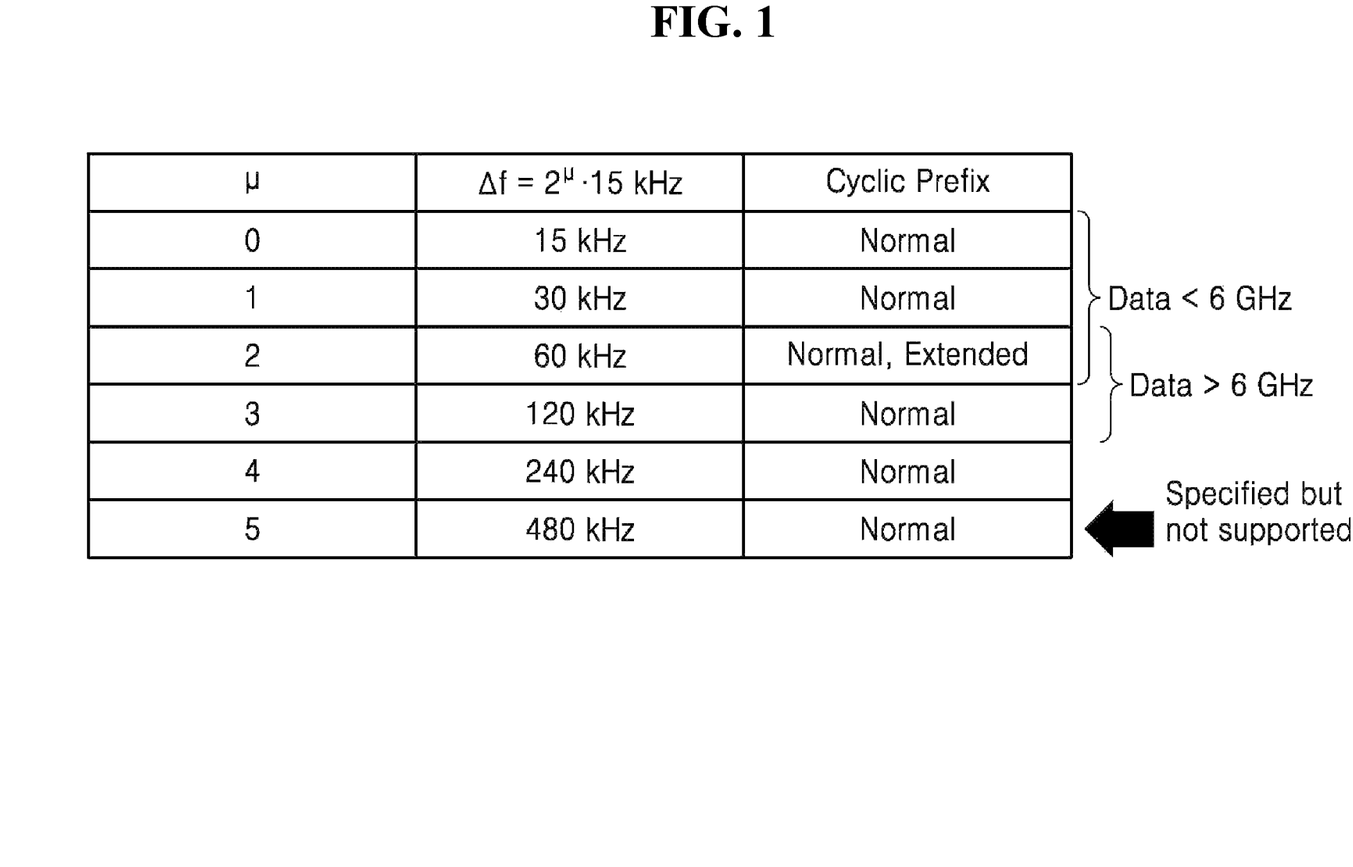
FIG. 1 illustrates a table detailing SCS options supported in NR according to embodiments of the present disclosure.

FIG. 1 illustrates a table showing SCS options in an NR system in FR1 (below 6 GHz) and FR2 (above 6 GHz, mmWave) according to embodiments of the present disclosure.

As shown in FIG. 1, the table illustrates SCS options in an NR system in FR1 (below 6 GHz) and FR2 (above 6 GHz, mmWave). It is clear that the SCS can be scaled by factors of 2µ, in relation to the base SCS of 15 kHz, which is the only SCS supported in the LTE system.

One consequence of the increasing SCS is that the symbol duration is consequently shortened by the same factor(s) of 2µ. In NR, one slot is defined as 14 symbols and, for higher SCS, the duration of the slots will be shortened. However, a subframe is defined as a 1 ms period, fitting in one slot in the 15 kHz SCS. For higher SCS, more slots (factors of 2µ) will therefore fit into the sub-frame.

It is possible to provide PRS pattern designs to cater for a situation where the neighbouring cells utilize different SCS. These patterns may be based on having continuous PRS bits in each slot (from slot 0 to slot 13), and repeating the PRS patterns in 2µ slots to fill the sub-frame in the higher SCS frame structure. While this design enables both the lower SCS and higher SCS UEs to read each neighbour cell's PRS patterns effectively, it may require the higher SCS UE to detect the entire sub-frame duration to retrieve the lower SCS cell's PRS pattern. For lower latency applications, this may add an unnecessary delay. Also, for low duty cycle (sensor type) positioning applications, the longer read time may translate to increased power consumption, which may drain the batteries more quickly.

To address such issues, embodiments of the disclosure provide configurable PRS patterns for the lower SCS cell. The UEs in the higher SCS cell may request these 'fast' PRS patterns from its serving cell and the serving cell passes on the request to the neighbour cell. The 'fast' PRS patterns may be based on densifying the default PRS pattern to fit within a time slot of the higher SCS cell.

As for the SCSs available for the FR1 in Table-1, the SCS ratios can be 1:2 or 1:4, with the factor µ=2 or 4. By use of PRS patterns according to an embodiment of the disclosure, the lower SCS PRS will condense in the time domain by the factor of µ. The following description will focus on FR1, as the OTDOA methods may be mostly applicable to the below 6 GHz FR1 region. However, the skilled person will appreciate that embodiments may be provided which can be used in the FR2 region, with its SCS ratios as well.

Figure 2:
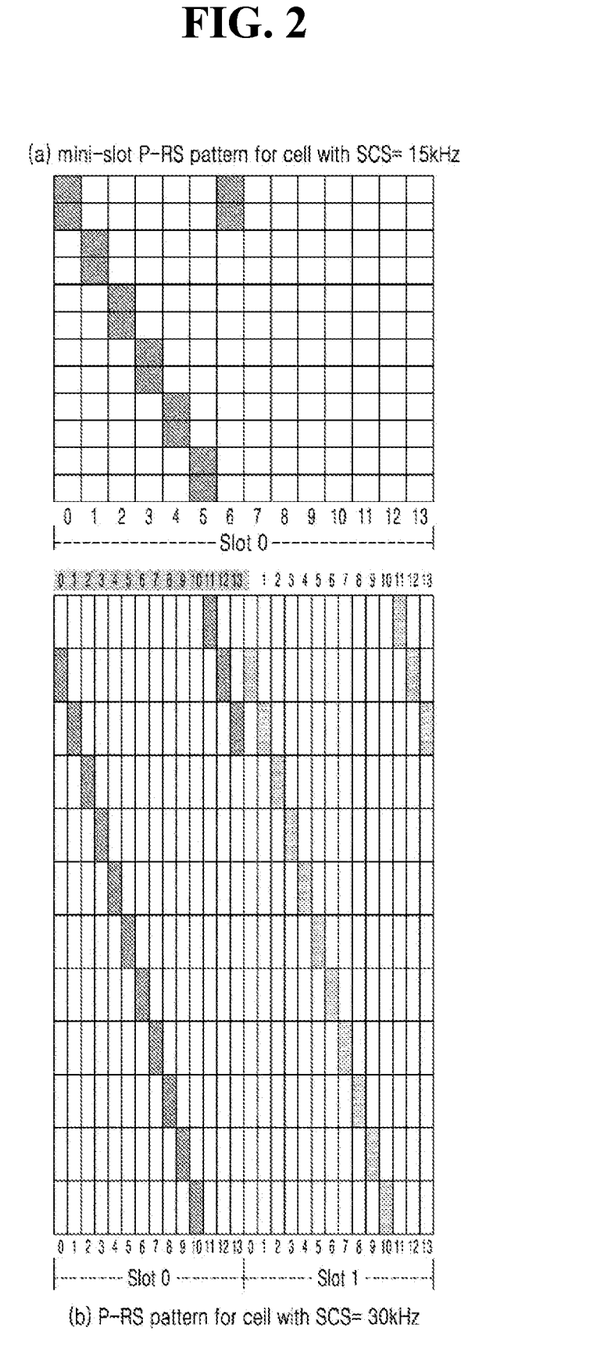
FIG. 2 illustrates PRS configuration for 15 kHz and 30 kHz SCS neighbour cells ($\mu=2$) according to embodiments of the present disclosure.

FIG. 2 illustrates PRS configuration for 15 kHz and 30 kHz SCS neighbour cells (µ=2) according to embodiments of the present disclosure.

As shown in FIG. 2, PRS patterns for the cases, (a) SCS=15 kHz and (b) SCS=30 kHz are shown. The same basic pattern can be applied when the neighbouring cells have SCS=30 kHz and SCS=60 kHz, as the same SCS ratio of µ=2 is retained. Essentially, with this configuration, the PRS pattern of the SCS=15 kHz cell may be condensed into the first 7 symbols, to align with the PRS duration of the SCS=30 kHz cell. Advantageously, a UE in the 30 kHz cell can read both these PRS patterns within a single slot in its time grid.

One issue in densifying the PRS patterns in this way is that the number of patterns which can fit within a 1/µ part of the slots (compared to a lower SCS cell) is effectively reduced by a factor equal to µ. If the example of FIG. 2 is considered, the 15 kHz cell(s) will have only 6 possible PRS patterns with densification. However, the second half of the 15 kHz SCS slots may be now vacant and they can accommodate different neighbour cells (of the same 15 kHz SCS) patterns. As such, the normal UE (either at 15 kHz or 30 kHz SCS) will not be disadvantaged by having less choice of neighbouring cells with distinct PRS patterns. The low latency UEs can utilize the PRS patterns in the first half slot to expedite their localization. Control bits to indicate PRS configuration may be also able to indicate which part (out of the μ parts) of the 15 kHz cell's slot will contain its PRS pattern.

Figure 3:
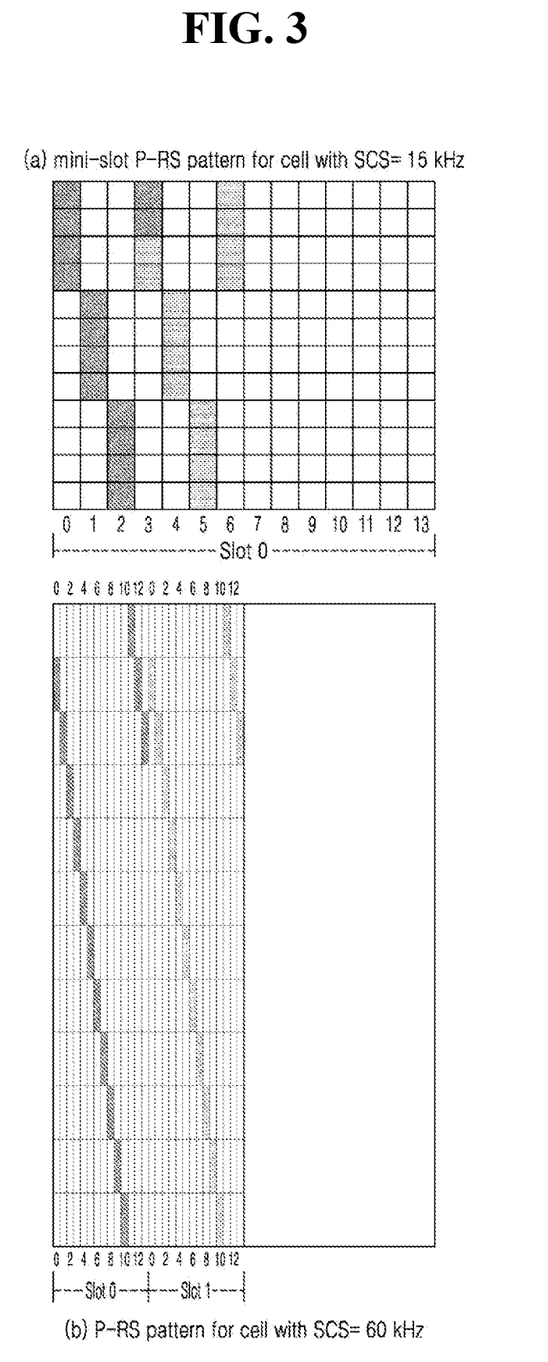
FIG. 3 illustrates PRS configuration for 15 kHz and 60 kHz SCS neighbour cells ($\mu=4$) according to an embodiment of the present invention.

FIG. 3 illustrates PRS configuration for 15 kHz and 60 kHz SCS neighbour cells (μ=4) according to an embodiment of the present invention.

As shown in FIG. 3, the same principles can be extended to 15 kHz and 60 kHz SCS neighbour cells, i.e. when μ=4, as opposed to μ=2. In this case, the PRS time density of the 15 kHz SCS cell can be increased by a factor of 4, in a configurable option. Example PRS patterns for this scenario are shown in FIG. 3. As the time density of the 15 kHz SCS cell's PRS pattern may be squeezed further to align with the slot duration of 60 kHz SCS cell, the PRS pattern spans 4 symbols as shown in FIG. 3.

Symbol 3 (i.e. the 4th symbol) may be shared between a first PRS pattern to align with the first slot of the 60 kHz SCS cell and then a second PRS pattern to align with the second slot of the 60 kHz SCS cell. In this manner, the total number of PRS pattern options for the 15 kHz SCS neighbouring cells may be not reduced. As noted before, these PRS patterns and the position in the 15 kHz sub-frame may be configurable by the control bits.

Embodiments of the disclosure, utilizing sub-slot (or mini-slot) based PRS patterns enable speedy detection of PRS (and hence localization) in both pre-FFT detection and post-FFT detection schemes in the receiver. These optional PRS patterns can be activated (for a short duration), when there is a request from a higher SCS neighbouring cell. The patterns can then revert back to the default full slot based PRS as required. The associated control signalling (with special control bits to change the pattern and indicate the position of the patterns within the 15 kHz SCS slot) may be provided to configure and terminate these special PRS patterns.

Figure 4:
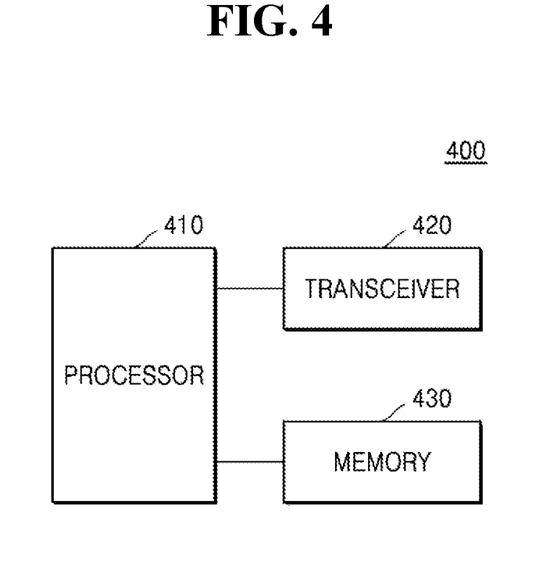
FIG. 4 illustrates a gNB according to embodiments of the present disclosure.

FIG. 4 illustrates a gNB according to embodiments of the present disclosure.

Referring to the FIG. 4, the gNB 400 may include a processor 410, a transceiver 420 and a memory 430. However, all of the illustrated components are not essential. The gNB 400 may be implemented by more or less components than those illustrated in FIG. 4. In addition, the processor 410 and the transceiver 420 and the memory 430 may be implemented as a single chip according to another embodiment. The gNBs, eNBs or BSs described above may correspond to the gNB 400.

The aforementioned components will now be described in detail.

The processor 410 may include one or more processors or other processing devices that control the proposed function, process, and/or method. Operation of the gNB 400 may be implemented by the processor 410.

In one embodiment, the processor 410 may transmit a second positioning reference signal (PRS) to a user equipment (UE), receive, from the UE, a request to request a neighbor BS to configure a first PRS to occupy $(1/\mu)^{th}$ of slot duration of a Sub Carrier Spacing (SCS) of the neighbor BS, and transmit the request to the neighbor BS. The neighbor BS may have a lower (SCS) than an SCS of the serving BS and μ may be the ratio of the SCS of the serving BS to the SCS of the neighbor BS.

In one embodiment, the first PRS may be configured to occupy $(1/\mu)^{th}$ of the slot duration of the neighbor BS to be arranged to have the same duration as the second PRS.

In one embodiment, a particular PRS configuration may be indicated by means of one or more control bits in signaling between the serving BS and the neighbor BS.

In one embodiment, the processor 410 may inform the UE about PRS configuration in the neighbor BS through physical downlink control channel (PDCCH).

In one embodiment, the first PRS may be configured for a defined time period before reverting to an original or another configuration.

In one embodiment, the processor 410 may inform the UE about the PRS configuration in any neighbors through its control channel, PDCCH, signaling.

The transceiver 420 may include a RF transmitter for up-converting and amplifying a transmitted signal, and a RF receiver for down-converting a frequency of a received signal. However, according to another embodiment, the transceiver 420 may be implemented by more or less components than those illustrated in components.

The transceiver 420 may be connected to the processor 410 and transmit and/or receive a signal. The signal may include control information and data. In addition, the transceiver 420 may receive the signal through a wireless channel and output the signal to the processor 410. The transceiver 420 may transmit a signal output from the processor 410 through the wireless channel.

The memory 430 may store the control information or the data included in a signal obtained by the gNB 400. The memory 430 may be connected to the processor 410 and store at least one instruction or a protocol or a parameter for the proposed function, process, and/or method. The memory 430 may include read-only memory (ROM) and/or random access memory (RAM) and/or hard disk and/or CD-ROM and/or DVD and/or other storage devices.

Figure 5:
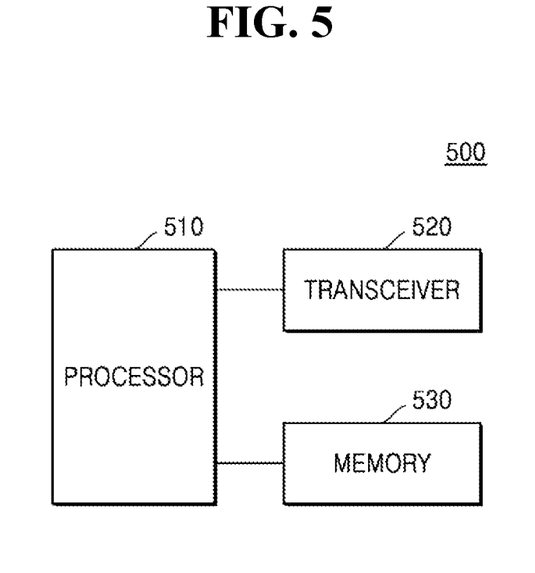
FIG. 5 illustrates a user equipment (UE) according to embodiments of the present disclosure.

FIG. 5 illustrates a user equipment (UE) according to embodiments of the present disclosure.

The UEs described above may correspond to the UE 500. Referring to the FIG. 5, the UE 500 may include a processor 510, a transceiver 520 and a memory 530. However, all of the illustrated components are not essential. The UE 500 may be implemented by more or less components than those illustrated in FIG. 5. In addition, the processor 510 and the transceiver 520 and the memory 530 may be implemented as a single chip according to another embodiment.

The aforementioned components will now be described in detail.

The processor 510 may include one or more processors or other processing devices that control the proposed function, process, and/or method. Operation of the UE 500 may be implemented by the processor 510.

In one embodiment, the processor 510 may receive a first positioning reference signal (PRS) from a neighbor base station (BS) and a second PRS from a serving BS, identify the neighbor BS having a lower Sub Carrier Spacing (SCS) than an SCS of the serving BS, and transmit, to the serving BS, a request to request the neighbor BS to configure the first PRS to occupy $(1/\mu)^{th}$ of slot duration of the SCS of the neighbor BS, where μ is the ratio of the SCS of the serving BS to the SCS of the neighbor BS.

In one embodiment, the first PRS may be configured to occupy $(1/\mu)^{th}$ of the slot duration of the neighbor BS to be arranged to have the same duration as the second PRS.

In one embodiment, a particular PRS configuration may be indicated by means of one or more control bits in signaling between the serving BS and the neighbor BS.

In one embodiment, the processor 510 may be informed from the serving BS about PRS configuration in the neighbor BS through physical downlink control channel (PDCCH).

In one embodiment, the first PRS is configured for a defined time period before reverting to an original or another configuration.

In one embodiment, the processor 510 may request a second cell's base station (gNB) to request a first cell's gNB to configure the first PRS to occupy $(1/\mu)^{th}$ of the slot duration of the first SCS cell.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the UE 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims.

The invention claimed is:

1. A user equipment (UE) in a wireless communication system, the UE comprising:
   a transceiver; and
   at least one processor operably connected to the transceiver, the at least one processor configured to:
   control the transceiver to receive a first positioning reference signal (PRS) from a first cell and a second PRS from a second cell;
   identify that a first Sub Carrier Spacing (SCS) of the first cell is lower than a second SCS of the second cell based on the first PRS and the second PRS; and
   control the transceiver to transmit, to the second cell, a request message to request the first cell to configure the first PRS to have a same slot duration as a slot duration of the second PRS.

2. The UE of claim 1, wherein the first PRS is configured to occupy $(1/\mu)^{th}$ of a slot duration of the first cell.

3. The UE of claim 1, wherein a PRS configuration is indicated by one or more control bits via signaling between the first cell and the second cell.

4. The UE of claim 1, wherein the at least one processor is further configured to:
   control the transceiver to receive, from the second cell, PRS configuration information for the first cell through a physical downlink control channel (PDCCH).

5. The UE of claim 1, wherein the first PRS is configured for a time period before reverting to an original or another configuration.

6. A second cell in a wireless communication system, the second cell comprising:
   a transceiver; and
   at least one processor operably connected to the transceiver, the at least one processor configured to:
   control the transceiver to transmit a second positioning reference signal (PRS) to a user equipment (UE);
   control the transceiver to receive, from the UE, a request message to request a first cell to configure a first PRS to have a same slot duration as a slot duration of the second PRS, wherein the first PRS is transmitted by the first cell; and
   control the transceiver to transmit, to the first cell, a request for configuring the first PRS to have the same slot duration as the slot duration of the second PRS based on the request message,
wherein a first Sub Carrier Spacing (SCS) of the first cell is lower than a second SCS of the second cell.

7. The second cell of claim 6, wherein the first PRS is configured to occupy $(1/\mu)^{th}$ of the slot duration of the first cell.

8. The second cell of claim 6, wherein a PRS configuration is indicated by one or more control bits via signaling between the first cell and the second cell.

9. The second cell of claim 6, wherein the at least one processor is further configured to control the transceiver to transmit, to the UE, PRS configuration information for the first cell through a physical downlink control channel (PDCCH).

10. The second cell of claim 6, wherein the first PRS is configured for a time period before reverting to an original or another configuration.

11. A first cell in a wireless communication system, the first cell comprising:
a transceiver; and
at least one processor operably connected to the transceiver, the at least one processor configured to:
control the transceiver to transmit a first positioning reference signal (PRS) to a user equipment (UE);
control the transceiver to receive, from a second cell, a request for configuring the first PRS to have a same slot duration as a slot duration of a second PRS, wherein the second PRS is transmitted by the second cell; and
determine a slot duration of the first PRS based on the request to have the same slot duration as the slot duration of the second PRS,
wherein a first Sub Carrier Spacing (SCS) of the first cell is lower than a second SCS of the second cell.

12. The first cell of claim 11, wherein the first PRS is configured to occupy $(1/\mu)^{th}$ of the slot duration of the first cell.

13. The first cell of claim 11, wherein a PRS configuration is indicated by one or more control bits via signaling between the first cell and the second cell.

14. The first cell of claim 11, wherein PRS configuration information for the first cell is transmitted by the second cell to the UE through a physical downlink control channel (PDCCH).

15. The first cell of claim 11, wherein the first PRS is configured for a time period before reverting to an original or another configuration.

\* \* \* \* \*